INVENTOR.
NORMAN L. HAIGHT
BY Joseph H. Lipschutz
ATTORNEY.

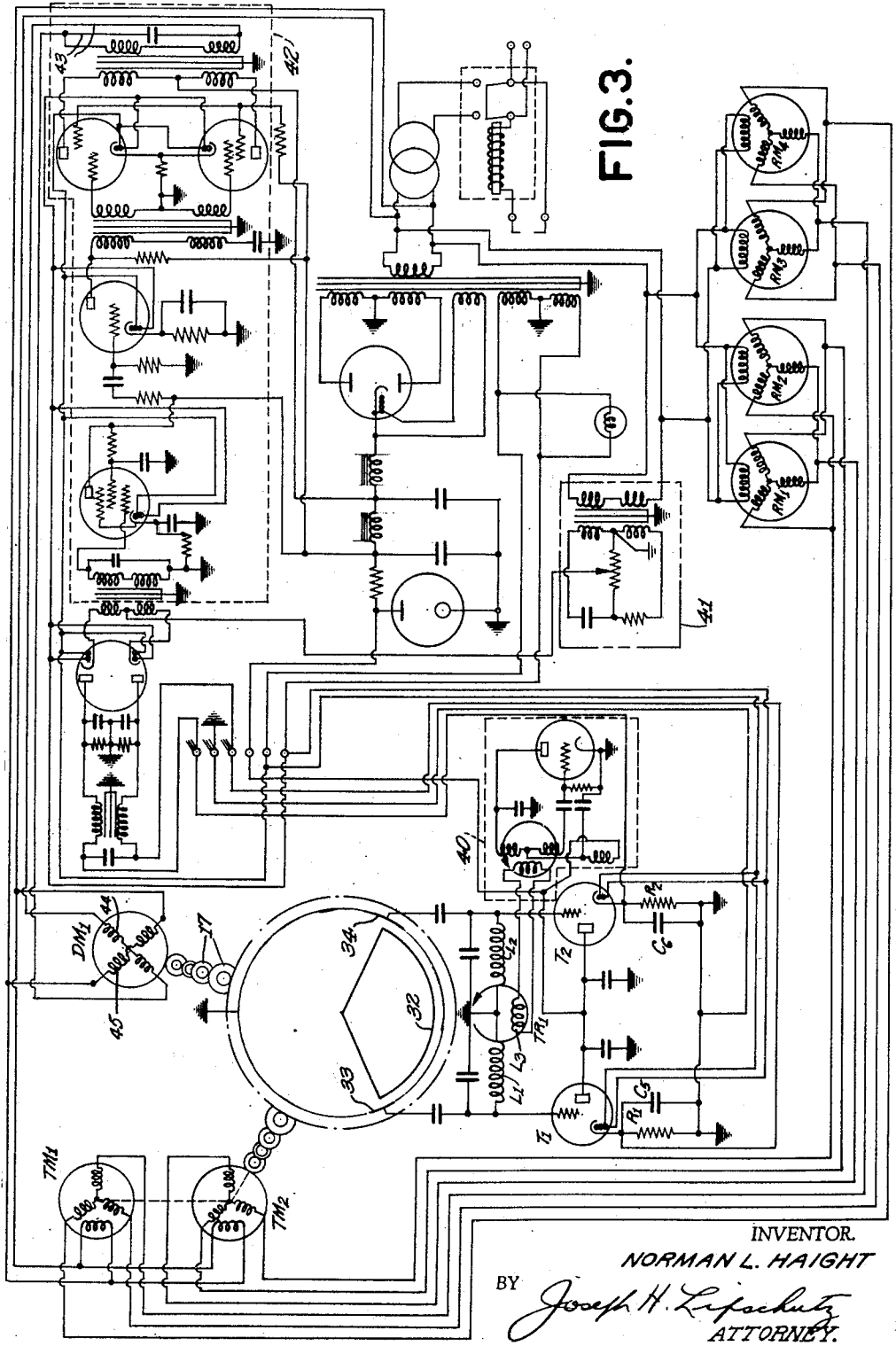

Patented June 30, 1942

2,287,876

UNITED STATES PATENT OFFICE 2,287,876

FOLLOW-UP MECHANISM

Norman L. Haight, East Orange, N. J., assignor to Sperry Products, Inc., Hoboken, N. J., a corporation of New York Application March 20, 1941, Serial No. 384,387

3 Claims. (Cl. 172—239)

This invention relates to follow-up mechanisms and has general application in every case where the movements of a member are adapted to be followed by another member. The purpose of following such first member is to find the position of said member and give an indication thereof where it might otherwise not be possible, and also to permit transmitting an indication of the position of said member to a remote point. The member whose movements are to be followed may be the direction-seeking element of a magnetic or gyroscopic compass, or it may be an indicator of an instrument such as a potentiometer. Such sensitive members usually cannot carry any appreciable load and thus it is not possible or desirable to load them for the purpose of performing any additional work, as, for instance, operating a transmitter which will transmit the indications of the position of the sensitive member to a remote point. Therefore the follow-up member is provided, and said member may be driven by power means sufficient to operate transmitting mechanisms. The follow-up member is designed to be so related to the sensitive member whose movements it is to follow, as to place little or no load upon the sensitive member. For this purpose, it has been proposed that the relative positions between the follow-up member and the sensitive member be controlled by variation of the capacity and resistance existing between said members, the dielectric for said capacity and resistance being formed by a fluid which permits relative movement between said members without placing any appreciable load upon the sensitive member.

It is the principal object of this invention to provide another means for controlling a follow-up in which the total capacity and resistance existing between the sensitive member and the follow-up member is not varied, but, rather, the total capacity and resistance remain constant and only the differential capacities and resistances at a plurality of points are employed for energizing the follow-up mechanism. Not only does the total capacity between said members remain constant, but the total inductance, resistance and capacitance between said members likewise remain constant.

It is a further object of this invention to control the follow-up mechanism not merely by differential variations in capacity at a plurality of points, but by differential variations of capacity and resistance at said points while the total capacity and total resistance of the system remain constant.

Further objects and advantages of this invention will become apparent in the following detailed description thereof.

In the accompanying drawings,

Fig. 3 is a wiring diagram of the invention.

Figure 1:
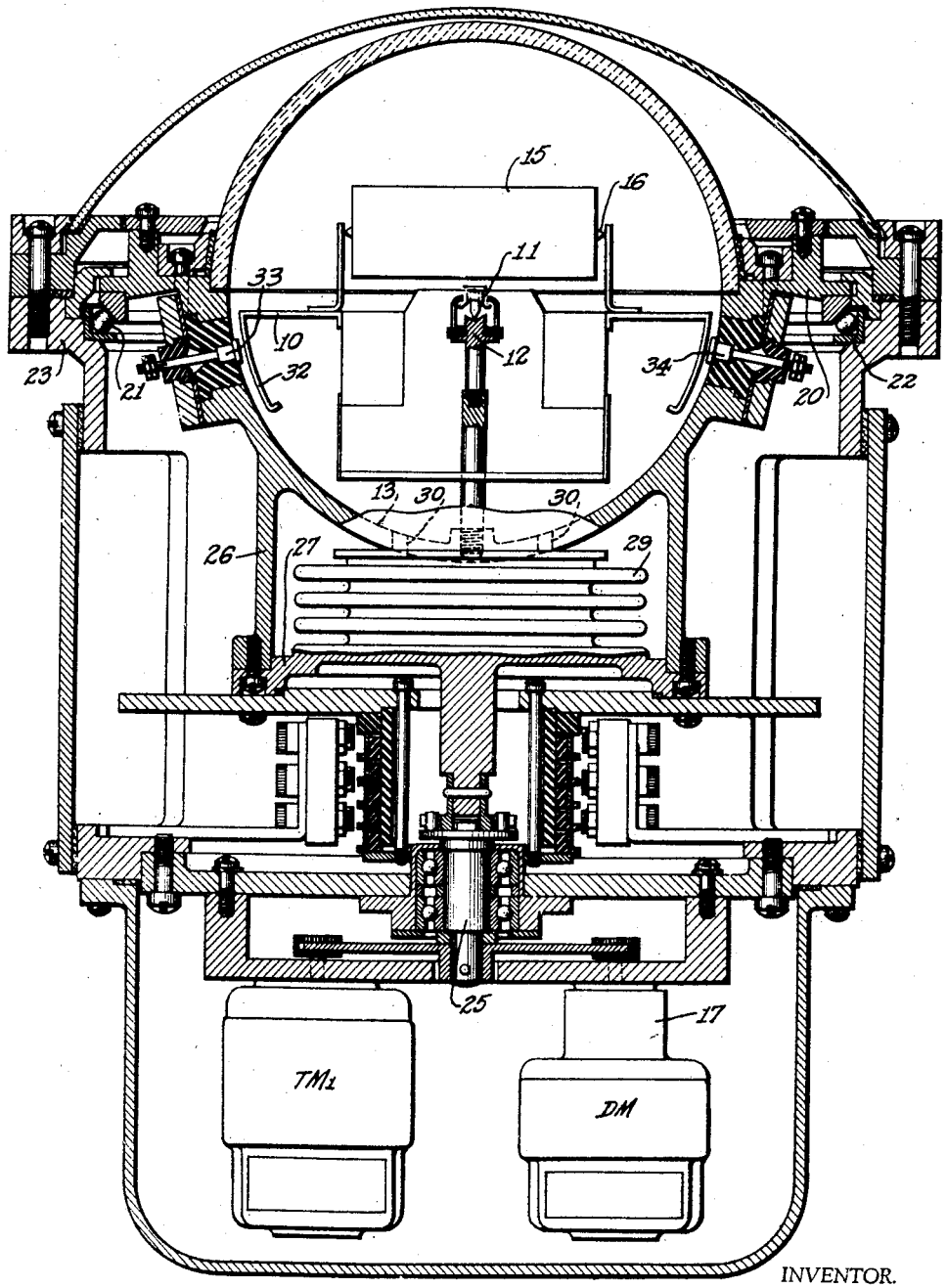
Fig. 1 is a vertical section through a magnetic compass having my follow-up mechanism applied thereto.

Referring to the drawings, I have shown my invention as applied to a magnetic compass, but it will be understood that the follow-up mechanism described herein has general application wherever the movements of a sensitive element are to be followed.

As shown, the sensitive element consists of a magnetic meridian-seeking element 10 having a pivot 11 mounted upon a bearing 12 fixed in a container 13 which may be a closed and opaque container so that the position of the sensitive element 10 within the container cannot be observed. The sensitive element may comprise a casing 15 within which one or more magnets are mounted, the said casing being pivoted at 16 so that the magnets are free to assume their natural angle of dip, and therefore it is not necessary to apply heavy weights to the card to prevent tilting thereof. The card, however, is sufficiently pendulous to overcome the friction of pivot 11 and to stabilize the card in a horizontal plane. The casing 13 and its enclosed sensitive member are supported by means of flange 20 on bearings 21 in a circular horizontal race 22 fixed to an outer casing 23 so that the inner casing 13 may rotate around a normally vertical axis. For so rotating the inner casing 13 there may be mounted on the base of the outer casing 23 a motor DM which is geared through reduction gearing 17 to a shaft 25 which supports the casing 13 by means of flange 26 fixed to a base 27 connected to said shaft 25. The downwardly extending flange 26 and the base 27 form a sealed chamber below the casing 13 in which there may be provided a sylphon tube 29 communicating through openings 30 with the interior of casing 13. The latter casing may be filled with a fluid so that the expansion and contraction of the fluid will be taken up by the expansion and contraction of the Sylphon tube. The outer casing 23 may be supported in any suitable manner, as by means of sets of gimbals to permit freedom of movement around two horizontal axes at right angles to each other.

The problem which is presented by the above construction is two-fold: First, in giving an indication of the position of the sensitive element 10, which is otherwise not feasible, and also in utilizing the relative movements between the sensitive element 10 and the casing 13 for the purpose of energizing mechanism capable of actuating remotely located indicators in synchronism with the movements of the sensitive element 10 so that one or more remote indications of the positions of the sensitive element may be obtained. Thus, in the case of a compass there may be operated a plurality of repeater compasses at various remotely located points which will show the position of the magnetic needle in the same manner as the needle itself.

Figure 2:
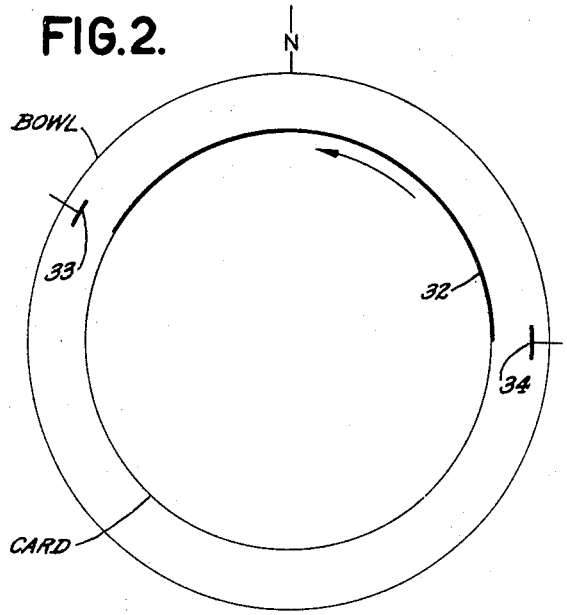
Fig. 2 is a plan view largely diagrammatic, showing the relative positions of the sensitive member and the follow-up member.

Referring to Fig. 2, it will be seen that I have provided the sensitive element with one member 32 of a condenser, and said member may take the form of an arcuate depending strip (see Figs. 1 and 3). Cooperating with said condenser plate 32 there are provided two small plates 33, 34 mounted on the casing 13 and insulated therefrom, and positioned so as to cooperate with the ends of plate 32 in such manner that the ends of plate 32 terminate approximately mid-way of the plates 33 and 34. If, now, suitable electric connections are made so that the plates 33 and 34 together with plate 32 and the fluid therebetween form condensers, the following characteristics will be observed when relative movement takes place between the casing 13 and the sensitive element 10: As one end of plate 32 cooperates with more of the surface of one of the plates 33 or 34 it simultaneously cooperates with less of the other plate. Hence the total capacity of the system including the plates 32, 33, 34 and the fluid therebetween is not varied although the differential capacities between 32 and 33 at one end and 34 and 32 at the other end have varied. Further, it will be seen that as the edge of plate 32 cooperates with more of one of the plates 33 or 34 and therefore the other edge cooperates with less of said other plate, the total resistance between 32, 33 and 32, 34 remains the same although the differential resistances between these elements have changed. By my invention I incorporate elements 32, 33 and 34 in a single system whose total capacity, resistance and inductance does not vary but in which the capacity, resistance, and inductance between one set of these elements 32, 33 increases or decreases differentially with respect to the other set of elements 32, 34 which decreases or increases simultaneously and to the same degree.

It will now be appreciated that if the sensitive element 10 remains fixed on the magnetic meridian and a ship on which the entire device is mounted rotates in azimuth, there will be relative movement between casing 13 and the sensitive element 10 by reason of the fact that the casing 13 moves with casing 23 and the ship in which the latter casing is gimbaled. As soon as said movement takes place the element 32 which is normally symmetrically positioned with respect to elements 33 and 34 now assumes a position wherein it cooperates with more of one of the elements 33, 34 and less of the other, depending upon the direction of movement of the craft. The same thing takes place if the craft does not turn in azimuth but for some reason the sensitive element should become displaced. In either case, the normal positioning of element 32 with respect to elements 33 and 34 is disturbed in the manner described, and this disturbance is utilized for the purpose of energizing the follow-up mechanism which will rotate the casing 13 in such direction as to restore the original relative positioning between element 32 and the elements 33 and 34. When such restoration has been effected, the follow-up mechanism becomes ineffective, and therefore the following mechanism will always occupy the same relative position as the sensitive element. In operating the following mechanism to follow the movements of the sensitive element, a force will be employed, as will hereinafter be explained, capable of operating suitable remotely positioned mechanisms which will repeat the indications of the sensitive element 10.

The means whereby the relative displacement of element 32 with respect to elements 33, 34 is caused to energize the following mechanism will now be described. The elements 32, 33 and 34 are included in a circuit comprising a transformer $TR_1$ in which the primary $L_3$ energizes two equal, series-connected inductance coils $L_1$ and $L_2$ connected to the elements 33 and 34, respectively. This constitutes a sensitive network consisting of two balanced circuits which may be more simply shown in Fig. 4 wherein the elements $C_1$ and $C_2$ are the condenser elements and $G_1$ and $G_2$ are the conductances formed by the element 32 and the elements 33 and 34, respectively, with the fluid therebetween. Upon this balanced sensitive circuit there is impressed a radio frequency signal by the mechanism contained within the dotted line box 40, the output of which is applied to the coil $L_3$.

In determining the resonance frequency of the balancing network, these factors must be considered: Firstly, the sensitive element 10 with its member 32 presents a capacity and resistance to the two pick-off elements 33 and 34 on the bowl or casing 13; secondly, the fluid between the elements 32 on the one hand and 33, 34 on the other possesses a dielectric constant and a resistance which is some function of the frequency of the applied potential. Therefore, instead of representing the reactance of elements 32, 33 and 32, 34 as pure capacity effects $C_1$, $C_2$ of the diagram of Fig. 4, we must now consider that these capacities are shunted by a resistance, namely the resistance of the fluid shown as $G_1$ and $G_2$ in Fig. 4. In said Fig. 4 we now have inductances $L_1$, $L_2$ and $L_3$ which are the three windings of the transformer, M representing the mutual inductances, the windings $L_1$ and $L_2$, $R_1$ and $R_2$ which represent the radio frequency resistance of the two windings of $L_1$ and $L_2$, $C_1$ and $C_2$ representing the capacitance between the pick-off elements 32, 33 and 32, 34, while $G_1$ and $G_2$ represent the fluid resistance or conductance between said pick-off elements. Only the elements $C_1$, $C_2$ $G_1$ and $G_2$ are variable, for as hereinbefore described, as $C_1$ decreases, $C_2$ must increase by an equal amount simultaneously with similar changes in $G_1$ and $G_2$.

Figure 4:
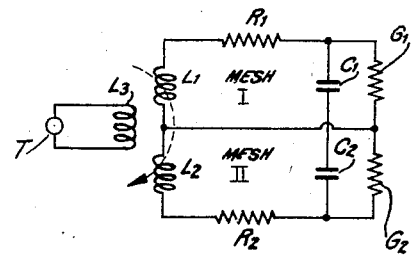
Fig. 4 is a wiring diagram showing another arrangement of certain of the parts of the diagram of Fig. 3.

The resonance frequency of the network shown in Fig. 4 is determined by the elements $L_1$, $L_2$, $R_1$, $R_2$, $C_1$, $C_2$, $M$, $G_1$ and $G_2$, and the two modes are given by the values $\lambda_1$ and $\lambda_2$ as follows:

$$\lambda_1 = -\frac{1}{2}\alpha + j\beta$$

$$\lambda_2 = -\frac{1}{2}\alpha - j\beta$$

in which $\alpha$ is the damping constant (natural decrement of the system) and $\beta$ is the natural angular velocity of the system. Their values are as follows:

$$\alpha = \frac{1}{2}\left(\frac{G_i}{C_i} + \frac{R}{L-M}\right)$$

$$\beta = \left[\frac{GR+1}{(L-M)C} - \frac{1}{4}\left(\frac{G}{C}+\frac{R}{L-M}\right)^2\right]^{1/2}$$

The undamped frequency is $$\omega_0 = \sqrt{\frac{1}{(L-M)C_0}}$$

This is the approximate frequency to which the R. F. generator 40 is tuned.

Figure 5:
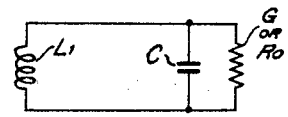
Fig. 5 is a view similar to Fig. 4 showing a modification.
Figure 6:
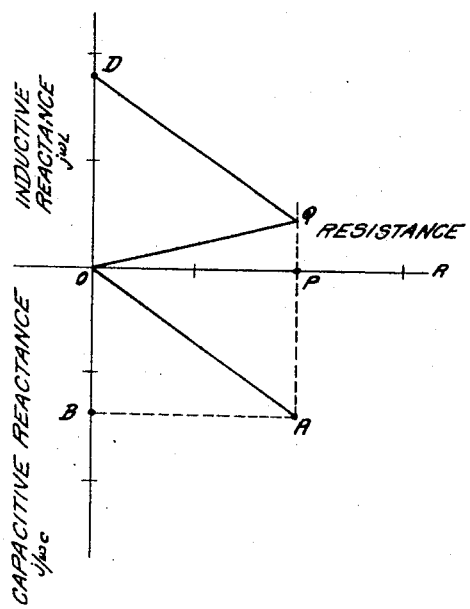
Figs. 6 and 7 are vector diagrams.

From the above equations it is apparent that the resonance frequency of the balancing network is a function not merely of the capacity but also of the resistance of the circuit. The conclusion just stated is verified by an analysis of one of the meshes of the net work, as simplified in Fig. 5 by the elimination of the resistance R. The vector diagram of the various reactances in the mesh of Fig. 5 is shown in Fig. 6 wherein the inductive reactances are shown in the conventional manner as positive, the capacitive reactances as negative, with both of these factors plotted against resistance. In this diagram, OD represents the inductive reactance due to coil $L_1$, OB the capacitive reactance of C, OP the resistance G or $R_0$. The line OA is the component which is the resultant of the resistance and capacitance in parallel, and these compounded with the inductive reactance OD gives the reactance represented by OQ.

Figure 7:
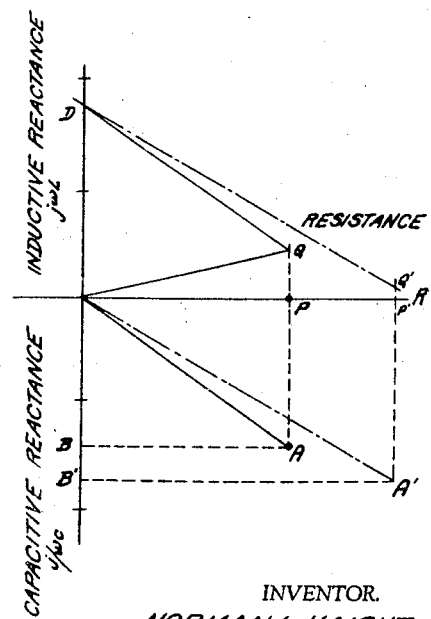

However, both $R_0$ and C may vary, and from the geometric properties of the sensitive element and the casing 13 we can state that in respect to one pick-off element a decrease in capacitance is accompanied by an increase in resistance. In other words, as the distance between the sensitive element and the bowl pick-off element is increased, the capacity between them decreases and the resistance increases. We can now redraw the vector diagram of Fig. 6 to show this phenomenon, and the new position of the vectors is indicated in Fig. 7. Whereas the initial position gave us a net inductance reactance QP, in the new position a length Q'P' is attained due to a decrease in capacitance and an increase in resistance. It is this impedance change as indicated by Q'P' that is utilized to energize the follow-up circuit.

The different inductive reactance Q'P' which is obtained upon relative movement of the pick-off elements 32, 33, 34 results in a potential which is proportional to the various impedances. The potential across the coil $L_1$ or $L_2$ is applied to the grid of the tube $T_1$ or $T_2$, and this controls the amount of current passing through it and the resistor $R_1$ or $R_2$. There is thus established in these two resistors $R_1$ or $R_2$ a potential which is determined by the vector impedances of meshes I and II (see Fig. 4). In the foregoing discussion we have considered only one mesh, namely, that shown in Fig. 5. In the practical case, the two meshes are not independent since they are coupled together by the mutual inductances $L_1$ and $L_2$. Since this is invariable, it does not invalidate the reasoning given for the general description of the mode of operation. It enters the discussion only because it has a definite role in determining the rate at which the impedances change in both meshes. The optimum value is of course the value for which there is obtained the maximum rate of change of impedance for small variations in R and C.

The radio frequency source 40 impresses voltage on L—3 and this by way of coils $L_1$, $L_2$ induces current through the two circuits which include condenser elements 32, 33 and 32, 34 respectively, the current in said circuits being normally equal and opposite in phase. The circuits are adjusted in the usual manner until they are at resonance with respect to the input frequency. Relative movement of the pick-off elements increases the current in one circuit and decreases the current in the other circuit to yield unequal voltages across the terminals of coils $L_1$ and $L_2$. The total voltage across the two coils, however, remains constant. The difference in voltage across the terminals of the two coils $L_1$ and $L_2$ gives a difference in potential at radio frequency which is the working force. These potentials are applied to the rectifier tubes $T_1$, $T_2$ or other unilateral devices designed to pass current in one direction. The output consists of pulsating D. C. voltages across the resistors $R_1$, $R_2$. These pulsations are wiped out by means of the condensers $C_5$, $C_6$ so that a steady D. C. potential drop across the two resistors $R_1$, $R_2$ is obtained. The amount of current which will flow through tubes $T_1$, $T_2$ is determined by the ratio of the currents $I_1$ and $I_2$ in the two meshes:

$$\frac{I_1}{I_2} = \frac{Z_0 + \dfrac{1}{G_2+j\omega C_2}}{Z_0 + \dfrac{1}{G_1+j\omega C_1}}$$

where $Z_0 = R + j\omega L$. From the above formula we can see that it is made up of both resistive and reactive components and is a confirmation of the conclusions reached from the formulas for resonance frequency and by the vector diagrams in Figs. 6 and 7.

The D. C. potential which has now been generated by reason of the relative displacement between pick-off elements 32, 33 and 34 is now adapted to be amplified to a point where it can be utilized to operate working mechanisms such as motors for actuating the casing 13 to follow the movements of sensitive element 10 as well as actuate transmitters or similar devices for operating remote controlled mechanisms. For this purpose, the D. C. potential which forms the output from resistors $R_1$, $R_2$ must be modulated to give a varying impulse preferably of the same frequency as the motor which it is to operate. Thus, if the follow-up is to be actuated by a sixty cycle motor $DM_1$ the said output potential is modulated by a sixty cycle A. C. modulating voltage mechanism which may be of any conventional design, one form of which is the standard design included in the dotted line box 41 which is designed to modulate the said input potential to produce a sixty cycle output for the second winding 44 of the motor $DM_1$ in phase with the first winding 45 of said motor which is energized from the main power supply. The modulated output may be then amplified by any suitable conventional amplifier such as the one shown in the dotted outline 42, and the output from said amplifier is led by leads 43 to the said second winding of the two-winding motor DM₁. Said motor through suitable reduction gearing 17 operates the casing 13 in such direction as to bring the pick-off elements 33 and 34 again into symmetrical relation with element 32. It is now apparent that casing 13 will follow every movement of sensitive element 10 and will therefore give an indication of the position of said sensitive element.

Sufficient power may be supplied by the motor DM₁ so that in rotating casing 13 it will rotate at the same time one or more transmitters TM₁, TM₂, which may be of the Selsyn type designed to operate a plurality of repeaters RM₁, RM₂, RM₃.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a follow-up system for sensitive elements, a follow-up element, an electric system including a plurality of condensers, each condenser comprising a member carried by said follow-up element, a member carried by said sensitive element and a conducting dielectric, said members being so positioned that relative movement between said elements increases the capacity and decreases the resistance of certain of said condensers while decreasing the capacity and increasing the resistance of the other of said condensers to the same amount so that the total capacity and resistance of said system remains constant, and means whereby the differential capacities and resistances between said condensers actuate said follow-up element in the same direction as said sensitive element.

2. In a follow-up system for sensitive elements, a follow-up element, an electric system including a condenser member carried by one of said elements, a plurality of condenser members carried by the other of said elements and a conducting dielectric between said first member and said last-named members, said plurality of members being positioned with respect to the first member so that relative movements between said elements cause said first member to increase its cooperation with one of said plurality of members and decrease its cooperation to the same amount with the other of said plurality of members whereby the total capacity and resistance of said system remain constant while increasing the capacity and decreasing the resistance between said first member and one of said plurality of members and decreasing the capacity and increasing the resistance between said first member and the other of said plurality of members, and means whereby the differential capacities and resistances between said first member and the respective members of said plurality of members actuate said follow-up element in the same direction as said sensitive element.

3. In a follow-up system for sensitive elements, a follow-up element, an electric system including a reactance member carried by one of said elements, a plurality of reactance members carried by the other of said elements and a conducting dielectric between said first member and said last-named members, said plurality of members being positioned with respect to the first member so that relative movements between said elements cause said first member to increase its cooperation with one of said plurality of members and decrease its cooperation to the same amount with the other of said plurality of members whereby the total reactance and resistance of said system remain constant while increasing the reactance and decreasing the resistance between said first member and one of said plurality of members and decreasing the reactance and increasing the resistance between said first member and the other of said plurality of members, and means whereby the differential reactances and resistances between said first member and the respective members of said plurality of members actuate said follow-up element in the same direction as said sensitive element.

NORMAN L. HAIGHT.